UNITED STATES PATENT OFFICE.

GEORG MERLING, OF FRANKFORT-ON-THE-MAIN, AND ALADAR SKITA, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

Δ-4-CYCLOGERANIC ACID AND PROCESS OF MAKING SAME.

No. 805,924.     Specification of Letters Patent.     Patented Nov. 28, 1905.

Application filed August 31, 1905. Serial No. 276,620.

*To all whom it may concern:*

Be it known that we, GEORG MERLING, professor of chemistry, a citizen of the Empire of Germany, residing at Frankfort-on-the-Main, and ALADAR SKITA, Ph. D., chemist, a citizen of the Empire of Austria-Hungary, residing at Höchst-on-the-Main, Germany, have invented certain new and useful Improvements in the Manufacture of Δ-4-Cyclogeranic Acid, of which the following is a specification.

Isophoronecarboxylic ester,

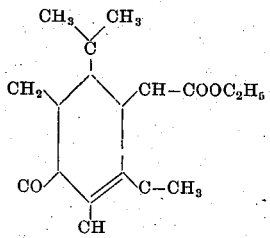

(German Patent No. 148,080,) as has been found by us, is converted by treatment with phosphorus pentachlorid into dichloro-Δ-2-cyclogeranic ester,

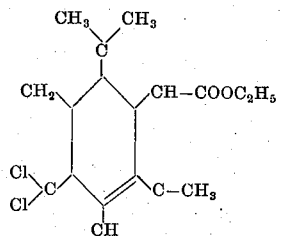

which readily loses one molecular proportion of hydrogen chlorid and becomes monochlorodehydro-Δ-2:4-cyclogeranic ester,

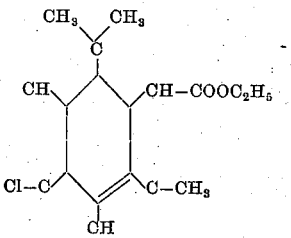

The monochlorodehydro-Δ-2,4-cyclogeranic acid produced by saponification of this latter ester can be further converted by reducing agents into Δ-4-cyclogeranic acid,

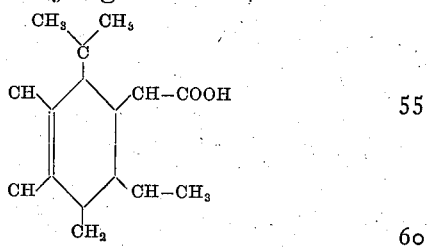

I. *Manufacture of monochlorodehydro-Δ-2,4-cyclogeranic ester.*—Into one hundred parts of isophorone carboxylic ester contained in a flask protected from access of moisture are introduced by degrees while cooling with ice and stirring one hundred parts of powdered phosphorus pentachlorid. The latter passes for the most part into solution without evolution of a considerable quanity of hydrogen chlorid. The liquid becomes brown. When the flask has been removed from the ice, there begins at once without appreciable rise of temperature a lively evolution of hydrogen chlorid. As soon as this diminishes the solution is gently warmed on the water-bath, while the vessel is vigorously rotated until the evolution of hydrogen chlorid, which is now violent, abates. Finally, for completing the reaction the mass is heated for a short time in the boiling-water bath. The loss of weight corresponds exactly with one molecular proportion of hydrogen chlorid. The red-brown oil is immediately distilled under diminished pressure. After the phosphorus oxychlorid has distilled away the monochlorodehydro-Δ-2,4-cyclogeranic ester passes over at between 108° and 112° centigrade under six millimeters pressure as a yellowish oil, which is contaminated by a small proportion of a solid substance of unknown nature consisting of microscopic needles. From this the oil may be freed by being heated for a short time with a small proportion of alcoholic potash. The yield of the ester is about eighty per cent. of that calculated.

The pure monochlorodehydro-Δ-2,4-cyclogeranic ester is a colorless and odorless mobile oil which boils at 108° centigrade under six millimeters pressure. It reduces ammoniacal silver solution in the cold and absorbs oxygen rapidly in air, hydrogen chlorid being eliminated. In closed vessels from which the air has been displaced by carbon dioxid it remains unchanged. When heated with alcoholic potash in absence of air, the freshly-distilled ester loses no trace of hydrogen chlorid, but is smoothly saponified into monochlorodehydro-$\varDelta$-2,4-cyclogeranic acid, which crystallizes from ethyl acetate or benzene in large lustrous colorless prisms and is oxidized in air as easily as is its ester.

II. *Reduction of monochlorodehydro-$\varDelta$-2, 4-cyclogeranic acid to $\varDelta$-4-cyclogeranic acid.*—One part of the ester is saponified by being boiled for several hours with one part of caustic potash and two parts of alcohol. The mixture is then diluted with twenty parts of alcohol. The clear solution is heated to the boiling-point, and one and one-half parts of sodium are introduced by degrees. When the metal has disappeared, the colorless solution, which is very turbid owing to the separated finely-divided salt, is diluted with water and the alcohol is driven over with steam. By adding dilute sulfuric acid to the cooled alkaline solution the $\varDelta$-4-cyclogeranic acid is precipitated as a yellowish oil, immediately solidifying to beautiful crystals. The acid can be isolated by draining and washing or by shaking out with ether. By a single recrystallization from hot ethyl acetate or ligroin it is obtained completely pure. The yield is nearly quantitative. The $\varDelta$-4-cyclogeranic acid is easily soluble in alcohol, ether, benzene, or acetone. From hot ethyl acetate or ligroin it crystallizes on cooling in large well-formed glassy prisms which melt at 103° centigrade. The solution of the acid in sodium carbonate decolorizes permanganate immediately in the cold. Under six millimeters pressure it boils at 123.5° centigrade undecomposed. The distillate, clear as water, immediately solidifies on cooling to a hard crystalline mass. The acid absorbs exactly two atomic proportions of bromin. The dibromo-addition product is distinguished from the dibromodihydro-alpha-cyclogeranic acid of Tiemann by its instability in that it loses one molecular proportion of hydrogen bromid even at ordinary temperature, becoming a monobromo-$\varDelta$-4-cyclogeranic acid.

The ethyl ester of $\varDelta$-4-cyclogeranic acid ($C_9H_{15}.COOC_2H_5$) obtained by boiling the alcoholic solution of the potassium salt with ethyl iodid is a colorless agreeably-smelling oil, boiling at 94° centigrade under six millimeters pressure. The same ester is produced by the reduction of the monochlorodehydro-$\varDelta$-2,4-cyclogeranic ester with sodium and alcohol, but together with a considerable proportion of the carbinol, ($C_9H_{15}CH_2OH$,) owing to simultaneous reduction of the $COOC_2H_5$ group.

The anilid of $\varDelta$-4-cyclogeranic acid ($C_9H_{15}.CONHC_6H_5$) forms colorless needles, which easily dissolve in hot alcohol, but are difficultly soluble in cold alcohol. It melts at 158° centigrade.

In a similar manner phosphorus pentabromid reacts with isophorone-carboxylic ester, yet less smoothly than phosphorus pentachlorid, and from the product of reaction may be obtained similarly as described above $\varDelta$-4-cyclogeranic acid. The reduction of monochloro or monobromo dehydro-$\varDelta$-2,4-cyclogeranic acid or its esters may occur, besides with sodium and alhocol, also in an acid solution—for instance, with glacial acetic acid and zinc-dust or with sodium amalgam in dilute acetic alcoholic solution; but the yields of $\varDelta$-4-hydrogeranic acid or its ester are essentially inferior to those of the process hereinbefore described.

The $\varDelta$-4-cyclogeranic acid serves for the manufacture of irone.

Having now described our invention, what we claim is—

1. The process herein described for the manufacture of $\varDelta$-4-cyclogeranic acid, which consists in producing monochlorodehydro-$\varDelta$-2, 4-cyclogeranic ester from isophorone carboxylic ester and phosphorus pentachlorid and in treating this ester with reducing agents.

2. The process herein described for the manufacture of $\varDelta$-4-cyclogeranic acid, which consists in producing monochlorodehydro-$\varDelta$-2, 4-cyclogeranic ester from isophorone carboxylic ester and phosphorus pentachlorid and in treating this ester after saponification with reducing agents.

3. As new product, the $\varDelta$-4-cyclogeranic acid being readily soluble in alcohol, ether, benzene and acetone, crystallizing from hot ethyl acetate or ligroin on cooling in large, well-formed, glassy prisms which melt at 103° centigrade; under six millimeters pressure it boils at 123° centigrade undecomposed; the distillate, clear as water, immediately solidifies on cooling to a hard crystalline mass.

In testimony that we claim the foregoing as our invention we have signed our names in presence of two subscribing witnesses.

GEORG MERLING.
ALADAR SKITA.

Witnesses:
JEAN GRUND,
CARL GRUND.